United States Patent [19]
Schulte

[11] Patent Number: 5,629,854
[45] Date of Patent: May 13, 1997

[54] DEVICE FOR DISPLAYING CARTOGRAPHIC INFORMATION, METHOD FOR DISPLAYING CARTOGRAPHIC INFORMATION, NAVIGATION SYSTEM PROVIDED WITH THE DEVICE AND VEHICLE PROVIDED WITH THE NAVIGATION SYSTEM

[75] Inventor: Hans H. Schulte, Eindhoven, Netherlands

[73] Assignee: U.S. Philips Corporation, New York, N.Y.

[21] Appl. No.: 400,317

[22] Filed: Mar. 3, 1995

Related U.S. Application Data

[63] Continuation of Ser. No. 951,513, Sep. 25, 1992, abandoned.

[30] Foreign Application Priority Data

Sep. 25, 1991 [EP] European Pat. Off. ............ 91202496

[51] Int. Cl.⁶ .......................... G08G 1/123; G08G 1/13
[52] U.S. Cl. .......................... 364/449.1; 364/443
[58] Field of Search ........................ 364/443, 449; 463/31; 473/407

[56] References Cited

U.S. PATENT DOCUMENTS

| 3,668,622 | 6/1972 | Gannett et al. ................ 340/27 |
| 3,784,969 | 1/1974 | Wilckens et al. ............... 340/27 |
| 4,894,774 | 1/1990 | McCarthy et al. .............. 463/31 |
| 4,937,570 | 6/1990 | Matsukawa et al. ............ 340/905 |
| 4,962,458 | 10/1990 | Verstraete .................... 364/443 |
| 4,963,864 | 10/1990 | Iihoshi et al. ................. 364/449 |
| 4,996,645 | 2/1991 | Schneyderberg Van Der Zon . 364/449 |
| 5,031,104 | 7/1991 | Ikeda et al. .................... 364/449 |
| 5,095,430 | 3/1992 | Bonito et al. .................. 364/410 |
| 5,115,398 | 5/1992 | De Jong ........................ 364/443 |
| 5,159,556 | 10/1992 | Schorter ....................... 364/449 |
| 5,161,886 | 11/1992 | De Jong et al. ................ 364/449 |
| 5,170,353 | 12/1992 | Verstraete .................... 364/449 |
| 5,179,519 | 1/1993 | Adachi et al. ................. 364/449 |
| 5,307,278 | 4/1994 | Hermans et al. ............... 364/443 |

FOREIGN PATENT DOCUMENTS

| 0355232 | 2/1990 | European Pat. Off. . |
| 0406946 | 1/1991 | European Pat. Off. . |
| 3905493 | 8/1990 | Germany . |

OTHER PUBLICATIONS

"Autoguide —Route Guidance in the United Kingdom" by I. Catling et al, Vehicle Navigation & Information Systems, Sep. 1989, Ontario, Canada, pp. 467–473.

*Primary Examiner*—Kevin J. Teska
*Assistant Examiner*—Tyrone V. Walker
*Attorney, Agent, or Firm*—Arthur G. Schaier

[57] ABSTRACT

A device for displaying cartographic information, such as traffic situations with navigation data in the case of use in a navigation system, contains a memory for cartographic data, a location-determining unit and a display, is provided with a selection unit for the repeated selection, on the basis of data from the location-determining unit, from the memory of data relating to a traffic situation to be anticipated and is provided with a processing unit for an analysis of the selected data and the generation, on the basis of the analysis, of a stylised display, which can be interpreted rapidly, of the traffic situation to be anticipated, optionally incorporating a symbol which indicates the route to be followed.

13 Claims, 4 Drawing Sheets

DEVICE FOR DISPLAYING CARTOGRAPHIC INFORMATION, METHOD FOR DISPLAYING CARTOGRAPHIC INFORMATION, NAVIGATION SYSTEM PROVIDED WITH THE DEVICE AND VEHICLE PROVIDED WITH THE NAVIGATION SYSTEM

This is a continuation of application Ser. No. 07/951,513, filed Sep. 25, 1992 now abandoned.

BACKGROUND OF THE INVENTION

1. Field of the Invention

The invention relates to a device for displaying cartographic information, comprising a memory for storing cartographic data, a location-determining unit and a display. In this context cartographic data are understood to be data such as: maps showing roads, data on the category of roads and junctions, locations of traffic lights, priority laws in force, speed restrictions and other traffic do's and don'ts, road names, traffic signs, signposts and zebra crossings, in short "road furniture", as well as petrol stations, hotels, restaurants and the like ("facilities") and prominent landscape features ("landmarks").

The invention also relates to a navigation system provided with the device, a vehicle provided with the navigation system and a method for displaying cartographic information on a display of a navigation system, which repeatedly determines a current position of a vehicle in relation to a road map stored in digitalized form and navigates the vehicle along a predetermined route.

2. Description of the Related Art

A device of this type is disclosed in the European Patent Application 0 355 232 A2. This application describes a device for displaying a section of a road map, only the route to be followed according to a navigation system being displayed, part for part, with the associated side routes (see FIGS. 1, 5, 15). Road sections can be rotated, magnified or reduced. A device of this type has the disadvantage that at a junction no specific information is given on the nature of the junction. A user is therefore obliged to make an instant on-the-spot evaluation of every traffic situation which requires a decision on his or her part.

German Offenlegungsschrift (German published specification) DE-3905493-A1 describes a navigation system with which a section of a road map is displayed showing the route to be followed (see FIG. 3). Abstract navigation symbols can also be shown at junctions (see FIGS. 4, 5, 6). However, these symbols, which are also known as pictograms, are so general that they can be used only for a small number of standard traffic situations. Moreover, standard traffic situations of this type are often clear and the additional information is therefore superfluous.

SUMMARY OF THE INVENTION

The aim of the invention is, inter alia, to provide a device for displaying cartographic information which provides the user with additional information in every traffic situation which places him or her before a choice or which is unclear, said information being provided so that the time required for interpretation of the display is so short that traffic safety will not be endangered. To this end, a device according to the invention is characterised in that the device is also provided with a selection unit for repeated selection from the memory, on the basis of data from the location-determining unit, of data relating to a prominent traffic situation which is to be anticipated, and is provided with a processing unit for an analysis of the selected data and the generation, on the basis of the analysis, of a stylised, easy-to-interpret display of the traffic situation to be anticipated. In this context a prominent traffic situation is understood to be: any situation where the user is placed before a choice (such as a junction, fork, roundabout or entry or exit slip-road), as well as situations which because of their nature are unclear or hazardous (such as sharp bends, speed ramps and the like). Thus without endangering traffic safety, a user-friendly display is produced for any arbitrary traffic situation, which display provides the user with specific information with regard to the situation with which he or she will be faced and in which a decision (relating to change of direction or speed) must be taken. This is effected by stylising in a clear manner, omitting superfluous information. Consequently, the time needed to interpret the display is minimal; this is an absolute necessity for traffic safety, and hence for the usability of navigation systems.

In one embodiment, the device according to the invention is characterised in that the processing unit comprises:

classification means for classifying the selected traffic situation and the corresponding selection of a standard display symbol; and adaptation means for adapting the display symbol to the specific cartographic circumstances of the selected traffic situation. Consequently, it is possible to take a collection of standard display symbols as the basis, which symbols are in each case adapted to the current situations accurately.

In a further embodiment, the device according to the invention is characterised in that the adaptation means comprise:

means for relocating road segments in the display symbol; and means for adding road segments to the display symbol. This makes it possible to display even the rarest traffic situations accurately.

In a further embodiment, the device according to the invention is characterised in that the adaptation means comprise:

means for rounding-off angles of road segments in the display symbol to multiples of a standard angle with respect to a reference axis. This type of representation is found to facilitate the ease of interpretation in practice.

In a further embodiment, a device according to the invention is characterised in that the adaptation means comprise:

means for creating a certain minimum distance between virtually parallel road segments in the display symbol which are less than this minimum distance apart.

This deliberate distortion of the actual situation increases the clarity of the display.

In a further embodiment, the device according to the invention is characterised in that the processing unit also comprises:

transformation means for showing the display symbol used in perspective, by means of coordinate transformation. A display in perspective (by means of coordinate transformation, which is known per se) increases the user friendliness.

A navigation system according to the invention is characterised in that it is provided with a device as described above and is also provided with a processor for navigating a user along a predetermined route on the basis of an input starting point and destination, with the aid of cartographic data in the memory, the processing unit also being provided with means for generating a symbol which shows the direction to be taken according to the predetermined route in a given traffic situation. A user of the navigation system can thus instantly see what he or she has to do in every traffic situation where a decision is required in order to follow the route which has been plotted (optionally by the navigation system itself).

A method according to the invention is characterised in that every prominent traffic situation to be anticipated on the route is analysed on the basis of selected data from the stored road map and is displayed in stylised form on approaching the traffic situation, an arrow showing the direction to be taken according to the predetermined route. In this way it is easier to follow the predetermined route.

In an embodiment, a method according to the invention is characterised in that only the traffic situations on the route which require the driver to change direction are displayed. Consequently, no superfluous information is displayed.

BRIEF DESCRIPTION OF THE DRAWING

The invention will be explained and illustrated by reference to the following figures with the associated description of the figures, wherein.

DETAILED DESCRIPTION OF THE PREFERRED EMBODIMENTS

Figure 1:
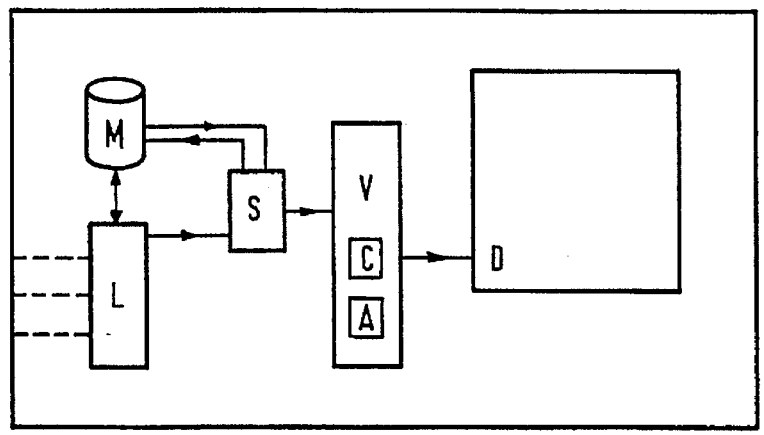
FIG. 1 shows a device according to the invention.
Figure 3A:
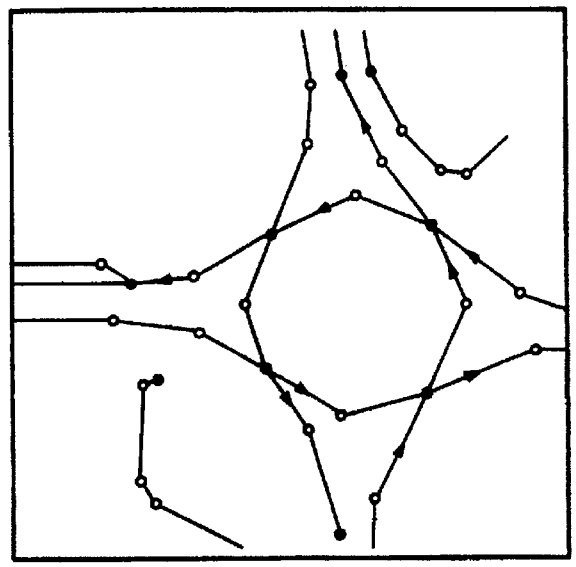
FIG. 3 illustrates the build-up of a stylised display.
Figure 3B:
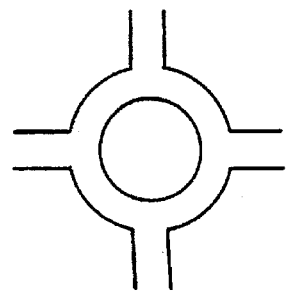
Figure 3C:
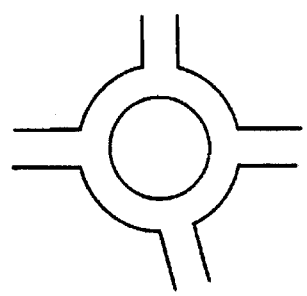
Figure 3D:
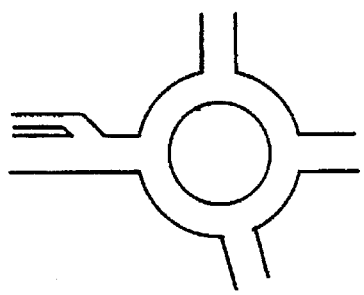
Figure 3E:
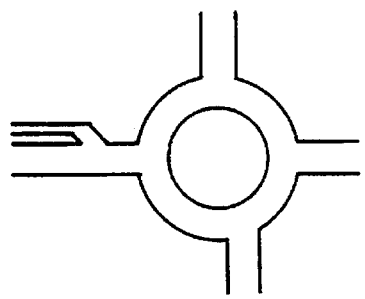
Figure 3F:
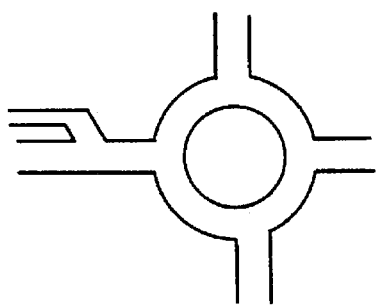

FIG. 1 shows a device for displaying cartographic information according to the invention. This device contains a memory M for storing cartographic data, such as road maps, data on the category of roads and junctions, locations of traffic lights, priority laws in force, speed restrictions and other traffic do's and don'ts. The memory can be fed, for example, via beacons along the road, or with data from a compact disc, which can contain 4800 M bit of digital data. The device also contains a location-determining unit L, which continually determines the location of a user of the device in his vehicle in relation to the road map which is stored in the memory M. A location-determining unit L of this type can be fed with signals from satellites to determine the current position, but can also function completely autonomically, for example with the aid of measured values from wheel sensors and a magnetic sensor (this is the reason for the broken lines in FIG. 1). The location can also be determined with the aid of infrared beacons along the road, or via a radio communications network. The device also contains a display D, for example a LCD or a monitor, or a head-up display. The selection unit S receives signals from the location-determining unit L which represent the location of the vehicle on the road map. Using this information, the selection unit S selects data from the memory M which relate to the direct environment of the vehicle. In addition, the selection unit S is able to derive the current direction of travel of the vehicle on the basis of at least two successive location determinations. Using this information, the selection unit S can make a further selection from the data already selected: the data relating to the next prominent traffic situation to be expected, where the user has to take a decision (for example a junction, a roundabout, a fork, an approach road, an exit road, a square, an entry or exit slip-road, a sharp bend, a speed ramp, and the like) are selected. These data are fed to a processing unit V, which analyses the data and on the basis of this analysis generates a stylised display of the relevant traffic situation. In more detail, this is effected as follows. The processing unit V contains classification means C, which, on the basis of the selected data, assign the traffic situation shown to a category, associated with a standard situation, by comparing the characteristics of the traffic situation with the characteristics of elements from a set of standard situations. In this context it is possible, for example, to differentiate between the following categories: junction with N (regularly distributed) feeder roads, where 3<=N<=10; roundabout with N feeder roads, where 3<=N<=12; square with N feeder roads, where 1<=N<=12; car park with N entries and exits, where 1<=N<=16, T junction (3 possible orientations); two-way fork; merging of two roads; entry slip road; exit slip road; sharp bend (2 orientations). Each category has a standard display symbol. The standard display symbols preferably have dimensions which are proportional to the dimensions of the actual situation which they represent. If a colour display is used, they can also be displayed in different colours. Of course, the set of standard situations can be expanded, but it will never be able to comprise all possible different traffic situations. For this reason the processing unit V contains adaptation means A, which adapt the display symbol chosen by the classification means C to the specific cartographic circumstances of the relevant traffic situation. The various features will be illustrated with the aid of FIG. 3 (subdivided into 3A to 3F). FIG. 3A shows a representation of data relating to a roundabout in the form in which these can be stored in the memory M: points with between them road segments, with a direction of travel. On the basis of these data, the classification means C select the symbol shown in 3B as standard display symbol: a roundabout with 4 regularly distributed feeder road segments. This standard display symbol is then adapted by the adaptation means A. Firstly, the point at which the lowermost displayed road segment joins the roundabout is relocated a little to the right. This is effected by relocation means which detect that the standard display symbol is not in sufficient agreement in this respect with the traffic situation represented by the selected data: see FIG. 3C. The service road is then added to the road segment shown on the left: see FIG. 3D. To this end, the adaptation means are provided with means for adding road segments to the display symbol. These means also determine that the road segments shown top right and bottom left in 3A are at this point in time of no interest to the user and therefore do not need to be displayed in the adapted display symbol. The road segment shown on the left is also extended for reasons of clarity. The angles of road segments are then rounded off to multiples of, for example, 15° with respect to a reference axis, formed, for example, by the line section which extends straight up from the centre of the roundabout. To this end the adaptation means comprise means for rounding off angles of road segments to multiples of a standard angle with respect to a reference axis. In the example, the consequence of this is that the lowermost road segment shown is rounded off to the vertical and that the short connecting segment between the road segment shown on the left and the service road makes a somewhat larger angle (for example 30°) with these road segments: see FIG. 3E. The adaptation means are also provided with means for creating a predetermined minimum distance between virtually parallel road segments in the display symbol, which are less than this minimum distance apart, which means, for reasons of clarity, increase the distance between the service road and the road segment shown on the left to a predetermined (adjustable) minimum distance: see FIG. 3F. The result is a stylised display of a specific traffic situation with which the user will be faced at this roundabout and which can be interpreted at a glance. Note that for clarity of the stylised display it is beneficial that the road segment on which the vehicle is located at the time of the display and from which the traffic situation is therefore approached is displayed as the lowermost road segment and vertically, following international conventions with respect to signposting. For this purpose, the adapted display symbol can, if necessary, be rotated, via a coordinate transformation which is known per se. Furthermore, it is obvious that, depending on the dimensions of any road segments added to the standard display symbol, the final adapted display symbol is scaled in a way that display D is well filled by the image.

Figure 2:
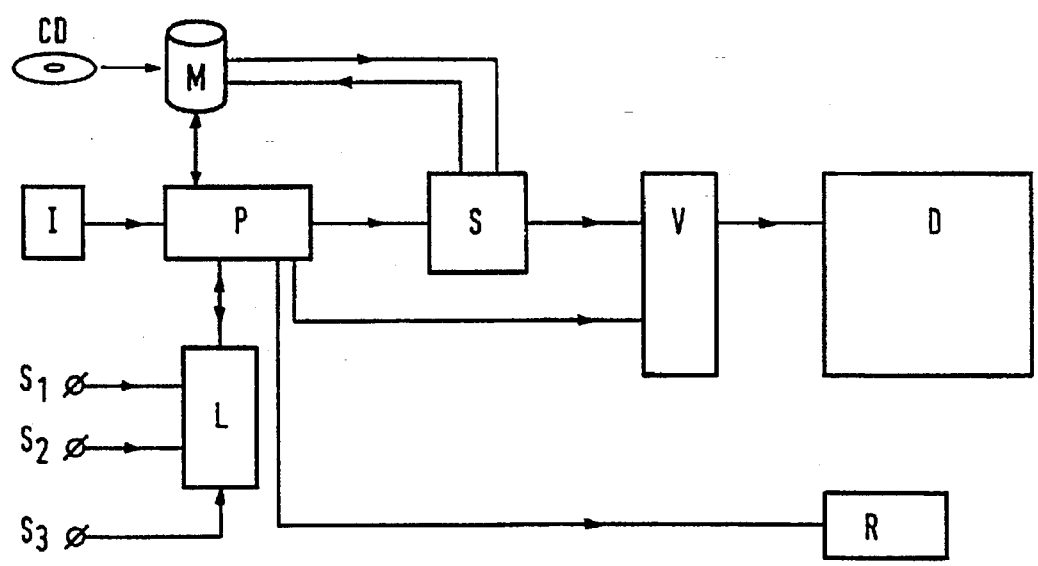
FIG. 2 shows a navigation system according to the invention.

FIG. 2 shows a navigation system according to the invention. Elements which correspond to those occurring in FIG. 1 are indicated in the same way. The system contains an input unit I for inputting a starting point and a destination by the user of the system. The user can also input a route in its entirety, but for the sake of simplicity it is assumed below that the navigation system plans a route (this is not relevant for the invention). On the basis of the input data, a processor P then determines an optimum route over the road map which is stored in digital form in memory M, for example fed by a CD. During the trip the location-determining unit L repeatedly determines the current position of the vehicle in relation to the stored road map, with the aid of sensors S1, S2 and S3 (for example wheel sensors and a magnetic sensor). The processor P gives signals to an audio unit R, which, for example, contains a speech synthesizer, to give audio navigation data to the user in good time. In this way the user is guided along the predetermined route. If the vehicle deviates from the planned route, the processor is immediately able to determine a new route, which is optimum at that point in time. In the manner described for FIG. 1, the selection unit S selects relevant data from the memory M, in this case on the basis of signals from the processor P which is connected to the location-determining unit L, for a subsequent prominent traffic situation which is to be expected on the basis of the planned route, which data are analysed by processing unit V and processed to give a stylised display of the next traffic situation to be executed. This stylised display is shown to the user in good time via display D, in combination with the audio instructions. Of course, it is also possible to provide the user with audio instructions only or with visual instructions only. Because a route is predetermined (or processor P has planned a route), the direction to be taken at the traffic situation is also shown by a symbol in the stylised display, for example an arrow over the road segments over which the vehicle has travelled and will travel on the route. To this end, the processing unit is also provided with means for generating a symbol which shows the direction to be taken at the traffic situation according to the predetermined route. This appreciably simplifies the task of the user: he or she immediately sees which actions are to be taken in the coming situation in order to follow the planned route. So as not to provide the user with an unnecessarily large amount of information, the processor can be set so that only the traffic situations on the route which require a change in direction are displayed in stylised form.

Figure 4A:
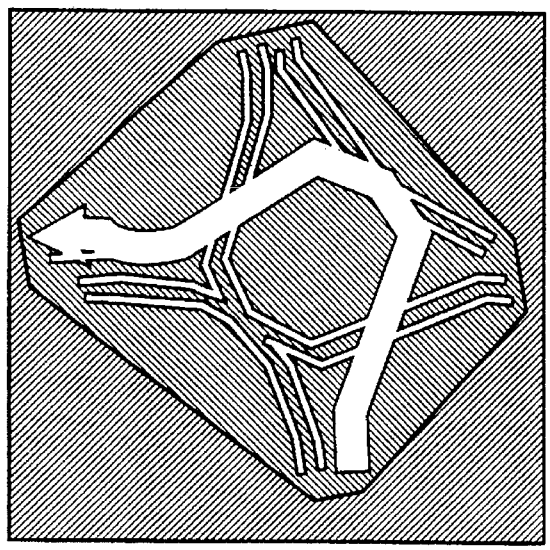
FIG. 4 shows the difference between an enlarged map section and an adaptive stylised display according to the invention.
Figure 4B:
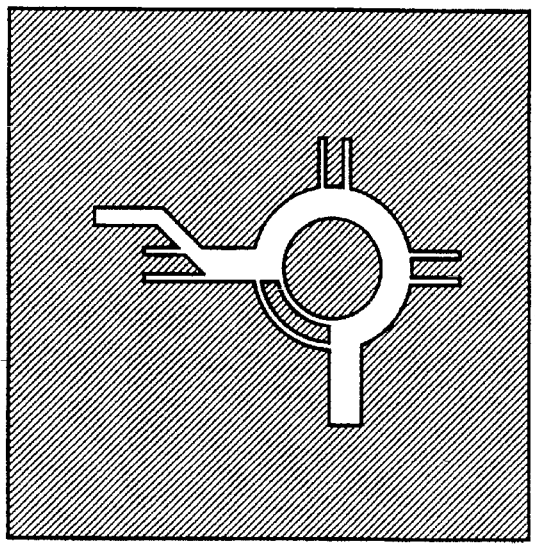

FIG. 4B shows how a stylised navigation instruction of this type appears in this system. For comparison, FIG. 4A shows how the same traffic situation would be displayed if the data from the road map stored in digitalized form (see FIG. 3A) were to be directly converted (without further analysis in the processing unit V) into an image which as it were zooms in on or enlarges a section of the map. The service road which the user has to take according to the planned route is not even visible and the image as a whole can be interpreted less rapidly than the stylised display of FIG. 4B. Note that the planned route is differentiated in the display from the other image segment shown.

Figure 5A:
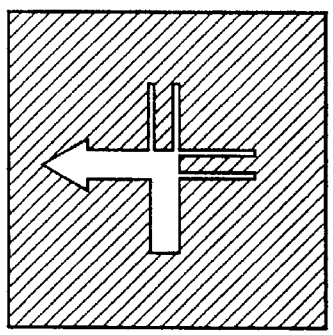
FIG. 5 shows an optional possibility for a perspective display.
Figure 5B:
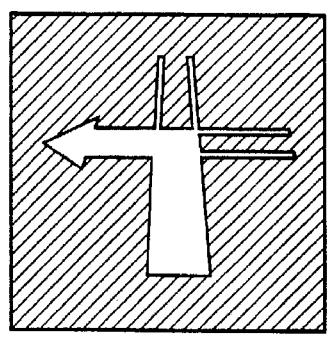
Figure 6A:
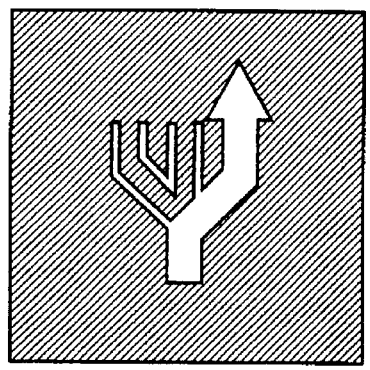
FIG. 6 gives examples of stylised displays.
Figure 6B:
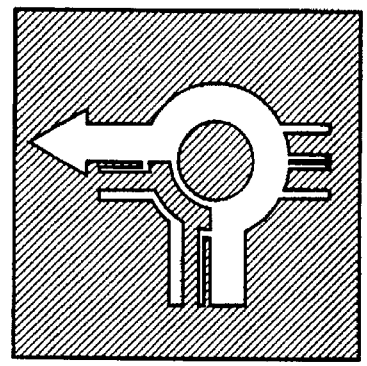
Figure 6C:
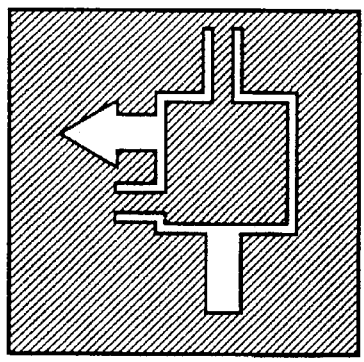
Figure 6D:
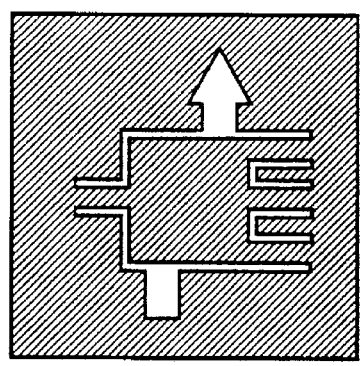
Figure 6E:
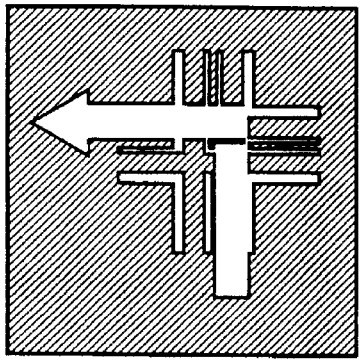
Figure 6F:
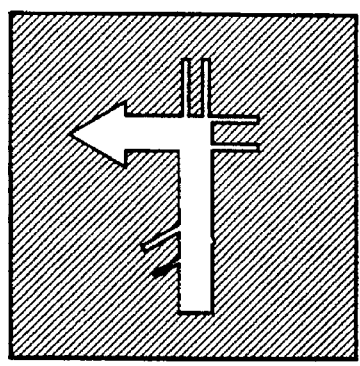

FIG. 5 illustrates a further option according to the invention. The processing unit can also contain transformation means for displaying the modified display symbol in perspective by means of a coordinate transformation (known per se). FIG. 5A shows a modified display symbol which the user sees on the display. It indicates that a left turn is required at the next junction. With the aid of the transformation means, this can also be shown as in FIG. 5B: in perspective. For some users, this display is easier to interpret. The perspective display is therefore an option in the system which can be selected by the user.

FIG. 6 shows a few more examples of stylised display symbols of the type which can be generated by the navigation system according to the invention. FIG. 6A symbolises: right fork at 3-way fork. FIG. 6B: second exit at roundabout, the dual road segments representing dual carriageways (in FIGS. 3 and 4 this has been omitted for convenience). FIG. 6C: second left on the square. FIG. 6D: cross the square at an oblique angle. FIG. 6E: left at junction of dual carriageways. FIG. 6F: left at the second junction. This FIG. 6F illustrates that in the case of various junctions or other traffic situations which follow one another in quick succession (less than a preset threshold value apart) on the route, these can be combined in a single stylised display. In this way the user will not be distracted by the presentation of less relevant information.

I claim:

1. Device for displaying cartographic information, comprising:

a memory for storing cartographic data in the form of a network of road segments, a location-determining unit for determining the location of a user with respect to said network, a selection unit for repeated selection from the memory, on the basis of data from the location-determining unit, of data representing an upcoming elementary road configuration presenting a decision to the user as to a change in road segment to be taken or a change in speed, a classification unit for analyzing the selected data representing the upcoming elementary road configuration and based on said selected data assigning from a set of basic pictograms depicting different elementary road configurations in a stylized easy-to-interpret way a basic pictogram that best corresponds to the selected data representing the upcoming elementary road configuration, an adaptation unit for geometrically adapting the assigned basic pictogram to conform to the selected data representing the upcoming elementary road configuration, and a display for displaying the adapted pictogram.

2. Device according to claim 1, wherein the adaptation unit comprises:

means for rounding-off angles of road segments in a pictogram to multiples of a standard angle with respect to a reference axis.

3. Device according to claim 1, wherein the adaptation unit comprises:

means for creating a predetermined minimum distance between virtually parallel road segments in a pictogram which are less than said minimum distance apart.

4. Device according to claim 1, wherein the adaptation unit also comprises:

transformation means for converting a pictogram in perspective, by means of coordinate transformation.

5. Device according to claim 1, wherein the adaptation unit comprises:

means for relocating a road segment in a pictogram; and means for adding a road segment to a pictogram.

6. Device according to claim 5, wherein the adaptation unit comprises:

means for creating a predetermined minimum distance between virtually parallel road segments in a pictogram which are less than said minimum distance apart.

7. Device according to claim 5, wherein the adaptation unit comprises:

means for rounding-off angles of road segments in a pictogram to multiples of a standard angle with respect to a reference axis.

8. Device according to claim 7, wherein the adaptation unit comprises:

means for creating a predetermined minimum distance between virtually parallel road segments in a pictogram which are less than said minimum distance apart.

9. Navigation system comprising a device for displaying cartographic information, comprising:

a memory for storing cartographic data representing a network of road segments, a location-determining unit for determining location of a user with respect to said network, a selection unit for repeated selection from the memory, on the basis of data from the location-determining unit, of data representing an upcoming elementary road configuration presenting a decision to the user as to a change in road segment to be taken or a change in speed, a classification unit for analyzing the selected data representing the upcoming elementary road configuration and for assigning from a set of basic pictograms depicting different elementary traffic situations in a stylized easy-to-interpret way a basic pictogram that best corresponds to the selected data representing the upcoming elementary road configuration, an adaptation unit for geometrically adapting the assigned basic pictogram to conform to the upcoming elementary road configuration, said adaptation unit including at least one of means for relocating a road segment in a pictogram and means for adding a road segment to a pictogram, a display for displaying the adapted pictogram, and a navigation unit for navigating a user along a predetermined route on the basis of an input starting point and destination, with the aid of cartographic data in said memory, the adaptation unit also being provided with means for adapting a pictogram to show a direction to be taken through the upcoming elementary road configuration in order to follow the predetermined route.

10. Vehicle provided with a navigation system according to claim 9.

11. Method for displaying cartographic information on a display of a navigation system which repeatedly determines a current position of a vehicle in relation to a network of road segments stored in digitized form and navigates the vehicle along a predetermined route, comprising the steps of: analyzing every upcoming elementary road configuration traversed on the predetermined route presenting a decision to the user as to a change in road segment to be taken or a change in speed using selected data from the stored road map, classifying the selected data representing the upcoming elementary road configuration and assigning from a set of basic pictograms depicting different elementary road configurations in a stylized easy-to-interpret way a basic pictogram that best corresponds to the selected data representing the upcoming elementary road configuration, geometrically adapting the assigned basic pictogram to conform to the upcoming elementary road configuration, displaying the assigned basic pictogram of each upcoming elementary road configuration that requires a change in road segment to be taken when the vehicle traverses said each upcoming elementary road configuration in order to follow the predetermined route, and showing an arrow on each said displayed pictogram indicating a road segment to be taken to follow the predetermined route.

12. Method according to claim 11, wherein pictograms are displayed only for upcoming elementary road configurations along the predetermined route which require the vehicle to change direction.

13. Method according to claim 11, wherein two or more upcoming elementary road configurations which are closer to one another than a threshold value are all displayed in a single pictogram.

* * * * *